United States Patent Office 2,714,616
Patented Aug. 2, 1955

2,714,616
PRODUCTION OF ANHYDROUS FORMALDEHYDE

Arthur W. Schnizer and Gene J. Fisher, Corpus Christi, Tex., assignors to Celanese Corporation of America, New York, N. Y., a corporation of Delaware No Drawing. Application September 18, 1952,
Serial No. 310,348

3 Claims. (Cl. 260—606)

This invention relates to the preparation of anhydrous formaldehyde, and more particularly to the production of anhydrous formaldehyde from trioxane.

Although monomeric formaldehyde may be obtained whenever formaldehyde solutions or linear polymers of formaldehyde are subjected to vaporization, the resulting monomeric product is generally not anhydrous and, due to the presence of water, polymerizes rapidly at temperatures below 100° C.

It is an object of our invention to provide a new and improved method for the production of anhydrous formaldehyde.

A further object of our invention is the provision of an improved method for obtaining substantially pure dry formaldehyde in high yields.

We have found that substantially pure dry formaldehyde may be obtained by treating trioxane in the vapor phase with an acidic catalyst to effect decomposition of the trioxane.

Trioxane is a cyclic trimer of formaldehyde, which is normally crystalline and which melts at about 61° C. and boils at about 114° C. It may be produced by distilling 50% aqueous formaldehyde containing a small amount of acidic catalyst, followed by extraction of the trioxane from the distillate with a water-immiscible solvent.

In a preferred method of practicing our invention, trioxane is boiled and its vapors are passed over a fixed catalyst bed at an elevated temperature, which may range from above the boiling point of trioxane, at the particular pressure employed, up to the decomposition temperature of formaldehyde, which is about 400° C. Instead of using a fixed bed, we may employ a fluidized bed by passing vapors of trioxane through a powdered catalyst at a velocity sufficient to maintain the powder in fluidized form.

The acidic catalysts which we employ for carrying out the reaction are preferably anhydrous non-volatile materials which do not react with formaldehyde under the reaction conditions. Examples of such materials are acidic ion-exchange resins, such as granular sulfonated copolymers of styrene and divinyl benzene; sulfonated coal or wood; copper pyrophosphate; boric acid; phosphoric acid, potassium hydrogen sulfate or other alkali or alkaline earth hydrogen sulfate; or aluminum sulfate. The acidic catalyst may be supported on a carrier, which may be in the form of either granules or powder of about 80–350 mesh suitable for fluidized beds. The carrier may be of the inert type, such as silicon carbide, gamma alumina or porous glass, or of the active type, such as activated carbon, silica gel or alpha alumina. For example, we may employ potassium hydrogen sulfate, or other alkali or alkaline earth hydrogen sulfate, supported on activated carbon or silicon carbide, phosphoric acid on silicon carbide, or aluminum sulfate supported on an inert or active carrier.

We have found that the optimum reaction temperature depends on the particular catalyst employed. For example, with phosphoric acid supported on silicon carbide best results are obtained at about 210° C. to 230° C., while with potassium hydrogen sulfate supported on active carbon a temperature range of about 115° C. to 125° C. is most suitable. With much higher temperatures such as temperatures above 300° C. there is some tendency for side reactions to take place, such as formation of methyl formate and decomposition to carbon monoxide and hydrogen.

The mass velocity of the trioxane with respect to the catalyst may be varied widely. For example, mass velocities of 0.3 to 2.5 parts by weight, of trioxane per part, by weight, of catalyst per hour may be employed.

The reaction may be carried out under atmospheric, super-atmospheric or subatmospheric pressures. The trioxane may be depolymerized in the presence of an inert gaseous diluent, such as methane, ethane, nitrogen or carbon dioxide.

In order further to illustrate our invention, but without being limited thereto, the following examples are given:

*Example I*

A catalyst is prepared by mixing 12 parts by weight of 85% phosphoric acid with 90 parts by weight of granules of porous silicon carbide of 4 to 8 mesh size (U. S. Standard screen size).

100 parts by weight of the resulting catalyst are placed in a catalyst chamber. The catalyst is heated to and maintained at a temperature of 200 to 240° C. Trioxane is then vaporized by boiling and the trioxane vapors are preheated to 210° C. and passed continuously into the catalyst chamber at the rate of 31.0 parts by weight per hour. The exit gases from the catalyst chamber are found to contain 27.6 parts by weight per hour of formaldehyde and no trioxane, carbon monoxide, hydrogen, methyl formate or water. Mechanical losses appear to account for the difference between the amount of trioxane used and the amount of formaldehyde obtained.

*Example II*

A catalyst is prepared by adsorbing 18 parts by weight KHSO$_4$ from a saturated solution on 90 parts by weight 4–8 mesh activated charcoal. Water is removed by drying 24 hours at 110° C.

Sixty parts by weight of the resulting catalyst are placed in a catalyst chamber. The catalyst is heated to and maintained at 115–125° C. Trioxane is then vaporized by boiling and passed continuously into the catalyst chamber at the rate of 242 parts by weight per hour. The exit gases are found to contain 216 parts by weight per hour of formaldehyde.

It is to be understood that the foregoing detailed description is given merely by way of illustration and that many variations may be made therein without departing from the spirit of our invention.

Having described our invention, what we desire to secure by Letters Patent is:

1. Process for the preparation of anhydrous formaldehyde which comprises passing vapors of trioxane over phosphoric acid at about 200 to 240° C.

2. Process for the preparation of anhydrous formaldehyde which comprises passing vapors of trioxane over phosphoric acid supported on silicon carbide at a temperature of about 210 to 230° C.

3. Process for the preparation of anhydrous formaldehyde which comprises passing vapors of trioxane at the rate of about 31 parts by weight per hour over about 100 parts by weight of a catalyst comprising about 10 parts by weight of phosphoric acid and about 90 parts by weight of silicon carbide of 4 to 8 mesh particle size at a temperature of 210 to 230° C.

References Cited in the file of this patent

UNITED STATES PATENTS 2,304,431    Walker _____ Dec. 8, 1942

OTHER REFERENCES

Bell et al.: Trans. Faraday Soc., vol. 35, pp. 474–481 (1939).

Walker: "Formaldehyde," Reinhold Pub. Corp., New York, N. Y. (pp. 98–99) (1944).